United States Patent
Chandler

(10) Patent No.: US 6,187,220 B1
(45) Date of Patent: Feb. 13, 2001

(54) ETHER HEAT AND MASS TRANSFER ADDITIVES FOR AQUEOUS ABSORPTION FLUIDS

(75) Inventor: Travis Chandler, Boulder City, NV (US)

(73) Assignee: Gas Research Institute, Chicago, IL (US)

( * ) Notice: Under 35 U.S.C. 154(b), the term of this patent shall be extended for 0 days.

(21) Appl. No.: 09/280,787

(22) Filed: Mar. 26, 1999

(51) Int. Cl.$^7$ ......................................................... C09K 5/00
(52) U.S. Cl. ................................. 252/69; 252/67; 62/112; 62/476
(58) Field of Search .................... 252/69; 62/112, 62/476

(56) References Cited

U.S. PATENT DOCUMENTS

| | | | |
|---|---|---|---|
| 2,040,905 | 5/1936 | Zellhoefer | 252/5 |
| 3,266,266 | 8/1966 | Reid, Jr. | 62/476 |
| 3,276,217 | 10/1966 | Bourne et al. | 62/101 |
| 3,296,814 | 1/1967 | Lynch et al. | 62/112 |
| 3,478,530 | 11/1969 | Aronson | 62/112 |
| 3,553,136 * | 1/1971 | Lyon | 252/69 |
| 3,580,759 | 5/1971 | Albertson et al. | 252/71 |
| 3,609,087 | 9/1971 | Chi et al. | 62/112 |
| 3,740,966 * | 6/1973 | Pravda | 62/476 |
| 3,783,631 | 1/1974 | Modahl et al. | 62/112 |
| 4,251,382 * | 2/1981 | Li | 252/69 |
| 4,315,411 | 2/1982 | Vardi et al. | 62/112 |
| 4,428,854 * | 1/1984 | Enjo et al. | 252/69 |
| 4,542,628 | 9/1985 | Sarkisian et al. | 62/335 |
| 4,732,008 | 3/1988 | DeVault | 62/79 |
| 4,823,864 | 4/1989 | Rockenfeller | 165/104.12 |
| 4,857,222 | 8/1989 | Itoh et al. | 252/69 |
| 4,966,007 | 10/1990 | Osborne | 62/101 |
| 5,038,574 | 8/1991 | Osborne | 62/101 |
| 5,186,009 * | 2/1993 | Rockenfeller | 62/112 |
| 5,335,515 | 8/1994 | Rockenfeller et al. | 62/476 |
| 5,390,509 | 2/1995 | Rockenfeller et al. | 62/476 |
| 5,419,145 | 5/1995 | Chandler et al. | 62/112 |
| 5,529,709 * | 6/1996 | Rockenfeller | 252/69 |
| 5,577,388 | 11/1996 | Chandler et al. | 62/112 |
| 5,829,259 | 11/1998 | Chandler et al. | 62/112 |

FOREIGN PATENT DOCUMENTS

| | | |
|---|---|---|
| 58-219938 * | 12/1983 | (JP) . |
| 59-91188 * | 5/1984 | (JP) . |
| 60-118785 * | 6/1985 | (JP) . |
| 60-159568 | 8/1985 | (JP) . |
| 61-14282 | 1/1986 | (JP) . |

OTHER PUBLICATIONS

Chemical Abstracts, AN 86:177557, "Surface–active agent of the lithium bromide–water absorption refrigerating machine", Iyoki et al., 1977.*

* cited by examiner

*Primary Examiner*—Necholus Ogden
(74) *Attorney, Agent, or Firm*—Pauley Petersen Kinne & Fejer

(57) ABSTRACT

An aqueous absorption fluid composition, process and apparatus wherein the absorption fluid comprises certain ethers providing improved water vapor absorption and thermal transfer in thermal exchange loops used in absorption refrigeration, chilling, heat pump, energy storage and other thermal transfer applications.

36 Claims, No Drawings

ETHER HEAT AND MASS TRANSFER ADDITIVES FOR AQUEOUS ABSORPTION FLUIDS

BACKGROUND OF THE INVENTION

1. Field of the Invention

This invention relates to an aqueous absorption fluid composition, process and apparatus providing improved water vapor absorption and thermal transfer. Addition of small quantities of certain ethers to an aqueous absorption fluid composition provides improved heat and mass transfer resulting in improved water vapor absorption and enhanced thermal and chemical stability. The compositions of this invention are particularly suited for use in high temperature stages of thermal transfer loops used in absorption refrigeration, chilling, heat pump, energy storage and other thermal transferring applications.

2. Description of Related Art

Aqueous metal halide solutions are well known as refrigerant/absorbent solutions for absorption refrigeration systems as taught by U.S. Pat. No. 3,478,530.

Alcohols have been widely used as additives in small amounts to aqueous refrigerant absorbent solutions for improved heat transfer. Octyl alcohol in LiBr solutions is taught by U.S. Pat. No. 3,276,217 and 4,857,222; certain secondary alcohols in LiBr solutions are taught by U.S. Pat. Nos. 3,609,087 and 4,315,411; certain tertiary alcohols are taught by U.S. Pat. No. 3,580,759; and fluoroalcohols are taught by U.S. Pat. No. 3,783,631.

Amines have been used as additives in small amounts to aqueous absorption systems for increased rate of water vapor sorption of working fluid as taught by U.S. Pat. Nos. 5,419,145; 5,577,388 and 5,829,259, for example.

Certain ethers are known as solvents for refrigerant methyl chloride used in absorption refrigeration as taught by U.S. Pat. No. 2,040,905.

Ethylene glycol monobutyl ether and diethylene glycol monobutyl ether additives, in amounts of 0.001 to 1.0 percent by weight, in concentrated lithium halide aqueous solutions are known as vapor pressure depressants for use in absorption refrigeration systems, as taught by U.S. Pat. No. 3,553,136.

The use of ether, specifically tetraethylene glycol dimethylether, as an absorbent in conjunction with an azeotropic mixture of trifluoroethanol and water as a cooling medium is taught by Japanese Patent Number 61-14282 to afford a wider temperature range of a cycle than a water/LiBr system in absorption refrigeration.

An absorption fluid of aqueous solutions of metal salts of alkali metal hydroxides, nitrites, and alkaline earth and transition metal hydroxides, halides and thiocyanates and about 10 to about 30 weight percent, based on the metal salt, of an organic compound including ethers, particularly alkaline glycol ethers is taught by U.S. Pat. No. 5,529,709 to provide increased absorbent solubility and vapor pressure reduction.

SUMMARY OF THE INVENTION

It is an object of this invention to provide an improved aqueous absorption fluid composition and process for thermal transfer having increased rates of water vapor absorption to result in improved thermal transfer.

It is another object of this invention to provide an improved aqueous absorption fluid composition and process for thermal transfer which allows use of reduced absorber size to obtain a specified thermal transfer.

Yet another object of this invention is to provide an aqueous absorption fluid composition which exhibits high stability to thermal decomposition and chemical reactivity to other components of the composition.

The above objects and other advantages of this invention which will become apparent upon reading this disclosure are achieved by addition of parts per million amounts of certain ethers to aqueous absorption fluids.

Components in the working fluid of an absorption thermal transfer cycle include chemicals which classified according to their use are defined in the art as follows:

"Refrigerant" is the chemical which vaporizes and condenses, or is absorbed, in large volume and the energy associated with this phase change being the essence of the system thermodynamics. In this invention water is the principal refrigerant.

"Absorbent" is the chemical(s) which have relatively low volatilities compared to the refrigerant, and high affinities for the refrigerant. Many suitable absorbents known to the art are suitable for use in this invention, such as those disclosed in U.S. Pat. No. 3,478,530, which is incorporated herein by reference. Lithium, zinc and calcium bromides and chlorides are among suitable absorbents. Lithium bromide compositions are most frequently used in large commercial refrigeration equipment. The properties of the refrigerant and absorbent(s) together in a refrigerant/absorbent(s) composition define the theoretical limits of the equilibrium thermodynamics of the absorption system. In this invention suitable absorbent(s) are at least one metal salt which is present in an amount sufficient to provide a composition functional as a refrigerant/absorbent(s) composition. Any of the above mentioned salts or combinations of salts, and also salts in combination with other non-interfering absorbents such as glycols or amines are suitable for use in this invention.

"Heat and mass transfer additive," an absorption promoter, serving to accelerate the rate of dissolving or absorption of the refrigerant by the absorbent. Added in small quantities, the heat and mass transfer additive does not directly change the system thermodynamics. Suitable heat and mass transfer additives according to this invention include certain ethers. This invention uses certain ethers as heat and mass transfer additives and not as absorbents. The prior art has used ethers, such as glycol ethers, in significantly large concentrations as absorbents. However, glycol ethers in small quantities, as illustrated by Comparative Example XIV, do not serve as heat and mass transfer additives as intended by the present invention. None of the prior art known to the inventor teaches suitable ethers as heat and mass transfer additives. Other additives, as pointed out in the Description of Related Art section above, particularly, the addition of certain amines as described in U.S. Pat. No. 5,419,145, which is incorporated herein in its entirety by reference, known for increasing the rate of absorption of the refrigerant into the absorbent to form the refrigerant/absorbent composition may be used in conjunction with the ether heat and mass transfer additives of this invention, as long as they are non-interfering.

"Corrosion inhibitors" for addition to the working fluid compositions are known to the art, such as, for example, salts of molybdate, nitrate, chromate, etc.; bases such as lithium hydroxide used to raise pH; and organic inhibitors, such as, benzotriazole and related compounds. Corrosion inhibitors sometimes interfere with other additives and one of the advantages of the ether heat and mass transfer additives of this invention is that they are significantly less susceptible to interfering reactions with corrosion inhibitors, and in general are more stable in an absorption chiller environment than other additives known to the prior art.

Other additives, such as, for example, crystallization inhibitors and other absorption promoters may be used as long as they do not interfere with the action of the heat and mass transfer additives of this invention.

DESCRIPTION OF PREFERRED EMBODIMENTS

This invention provides an improved absorption or absorption refrigeration fluid of the type comprising water as the refrigerant and at least one absorbent comprising a metal salt present in an amount sufficient to provide a functional refrigerant/absorbent(s) composition having an amount of ether(s) sufficient to provide higher heat and mass transfer resulting in increased rate of thermal transfer of the absorption thermal transfer system.

The metal salt absorbent reduces the vapor pressure of the aqueous refrigerant/absorbent composition sufficiently to provide a composition useful as a refrigerant/absorbent composition. Some suitable salts include at least one cation selected from the group consisting of ammonium, alkali metals, alkaline earth metals, transition metals and mixtures thereof, and at least one anion selected from the group consisting of halide, nitrate, nitrite, thiocyanate and mixtures thereof. Some metal salts useful in this invention include, for example, ammonium or alkali metal, such as lithium, nitrates, nitrites and halides, such as, chlorides, bromides and iodides; alkaline earth metal, such as calcium and magnesium, transition metal, such as iron, cobalt, copper, aluminum and zinc halides and thiocyanates; and mixtures thereof. Particularly suitable for use in this invention are lithium bromide, lithium chloride, lithium iodide, zinc chloride, zinc bromide, zinc iodide, calcium chloride, calcium bromide, calcium iodide, lithium nitrate and mixtures thereof. Particularly suitable combinations include combinations of transition metal or zinc salts, such as zinc bromide, zinc chloride and mixtures thereof, with lithium bromide, lithium chloride and mixtures thereof. Lithium bromide is a particularly useful salt in the refrigerant/absorbent composition of this invention. Suitable initial concentrations of metal salts in the refrigerant/absorbent compositions of this invention are about 30 to about 85 weight percent, and preferably, about 45 to about 75 weight percent.

In accordance with certain preferred embodiments of the invention, absorbents for use in the invention comprise one or more metal halide salts. As will be appreciated, absorption fluid compositions in accordance with the invention may also advantageously include one or more corrosion inhibitors, such as described above, or in the form of one or more metal hydroxides, present in low levels or concentrations. Specific preferred candidates of such metal hydroxide corrosion inhibitors include: lithium hydroxide for those fluids of lithium bromide and lithium hydroxide, zinc hydroxide, or possibly zinc oxide, or some combination thereof for those fluids containing zinc and lithium bromide.

The use of lithium hydroxide and the like to control or assist in controlling corrosion is generally known to those skilled in the art. As will be appreciated, the specific amount used of such corrosion inhibitor can be dependent on various factors such as the presence and amounts of other corrosion inhibitors. In general, the corrosion inhibiting inclusion of lithium hydroxide to a concentrated lithium bromide solution will fall in the range of about 0.002N to about 0.300N lithium hydroxide.

It is to be understood, however, that the broader practice of the invention is not necessarily limited to non-acidic solutions. For example, the ether additives of the invention may, if desired, be employed in conjunction with acidic solutions.

In one embodiment of this invention, a useful refrigerant/absorbent composition comprises the combination of zinc and lithium bromides and a corrosion inhibitor. The combination may have ratios of zinc bromide/lithium bromide of about 3/1 to about 1/3 by weight, particularly suitable ratios being about 1.6 to about 1.9. A suitable source of corrosion inhibitor is lithium hydroxide in an amount of about 0.0005 to about 0.02 gram per gram of total salt.

Suitable ethers for use as heat and mass transfer additives for aqueous absorption fluids according to this invention include ethers normally liquid at system operating conditions. Suitable ethers include aliphatic and aromatic ethers which do not normally form stable, i.e., irreversible, complexes with the metal salt absorbent in the composition, where irreversible is defined as a complex that remains bound substantially longer than the ligand (water) exchange rate. Particularly, poly ethers based upon short chain glycols, such as those forming 5 to about 8 membered rings with the absorbent cation, are not suitable, as demonstrated by Comparative Example XIV. The ethers may have other functional groups in the same molecule, such as amines and alcohols, as long as they do not interfere with the activity of the ether function and do not enhance irreversible complex formation with the metal salt absorbent.

Suitable aliphatic ethers include straight and branched chain symmetric and asymmetric ethers and cyclic ethers. Cyclic ethers may be especially preferred. Aliphatic ethers for use in the practice of the invention include those having about 4 to about 20 carbon atoms, such as, for example, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl which may be symmetrical or asymmetrical, branched chain, or cyclic. Cyclic ethers, such as, for example, substituted tetrahydrofurans, are examples of preferred cyclic ethers. Lower molecular weight ethers, 6 carbon atoms and less, are generally not as satisfactory for use because they tend to have too high a volatility, resulting in lower performance at higher concentrations of ether additive. Fluorinated and perfluorinated cyclic ethers, such as, for example, perfluoro-2-butyltetrahydrofuran, and fluorinated and perfluorinated ethers having about 8 to about 24 carbon atoms, such as, for example, perfluoroheptyl ether, perfluorooctyl ether, perfluorononyl ether, perfluorodecyl ether, and the like, may serve to provide good results at lower operating temperatures.

Aromatic ethers having about 7 to about 20 carbon atoms are suitable for use in this invention, such as, for example, diphenyl ether, methylphenyl ether (anisole), and dibenzyl ether. Also suitable for use in the practice of the invention are fluorinated and perfluorinated aromatic ethers.

Fluorinated and perfluorinated compounds of the above described suitable ethers, such as, for example, perfluorinated 2-butyltetrahydrofuran, have been found especially suitable for use as heat and mass transfer additives according to this invention due to their enhancement of thermal stability, such as may be necessary for direct-fired double-effect and triple-effect chillers, especially in mixed lithium-zinc bromide compositions.

The amount of ether heat and mass transfer additive to obtain maximum results depends upon the combination of the specific heat and mass transfer additive used, the refrigerant/absorbent composition, and the operating conditions. The amount of a specific heat and mass transfer additive desired for maximum results can be readily determined by one skilled in the art. Suitable relative amounts of heat and mass transfer additive range from about 5 ppm to about 10,000 ppm, and most preferably about 5 ppm to about 2,000 ppm, where such additive proportions are based on the weight of the total refrigerant/absorbent composition. About 50 ppm to about 500 ppm of the heat and mass transfer additive is preferred in many refrigerant/absorbent compositions. When refrigerant/absorbent compositions having lower volatility are used, less volatile heat and mass transfer additives are needed. Unless a heat and mass transfer additive of sufficiently low volatility is used, suitable upper concentrations of heat and mass transfer additives are about 100 ppm to 500 ppm for hydrocarbon ethers and about 400 ppm to about 2000 ppm for perfluorinated ethers, due to the increase in molecular weight.

The lower molecular weight ethers, 8 carbon atoms and less, such as, anisole or butyl ether, do not do as well when run at high temperatures and absorbent concentrations because they tend to be too volatile. A consequence of excessive heat and mass transfer additive volatility is a drop in performance at higher additive concentrations. Higher molecular weight ethers according to this invention, such as those having about 12 to about 24 carbon atoms, including partially fluorinated and perfluorinated ethers, such as perfluorooctyl ether, perfluorononyl ether, perfluorodecyl ether, and the like, for example, are especially suitable for use in double-effect machines operating with generator temperatures of about 360° F. and triple-effect machines operating with generator temperatures of about 450° F.

The refrigerant/absorbent compositions of this invention may also include one or more other heat and mass transfer additives, such as amines as taught by U.S. Pat. Nos. 5,577,388 and 5,829,259 and alcohols.

The refrigerant/absorbent compositions comprising ethers for use as heat and mass transfer additives in this invention may also contain one or more additional optional additives, such as, for example organic crystallization inhibitors, usually having an amino or hydroxyl functional group, corrosion inhibitors, or other additives, as long as they do not significantly interfere with the activity of the ether function.

This invention includes a process and apparatus for absorption thermal storage, cooling or refrigeration using the refrigerant/absorbent composition of this invention. Suitable apparatus and process for use of the refrigerant/absorbent composition of this invention includes absorption chillers and refrigeration systems as disclosed in U.S. Pat. Nos. 4,966,007, 5,038,574 and 5,186,009, thermal energy storage systems as disclosed in U.S. Pat. No. 4,823,864, as well as multiple effect absorption refrigeration systems, for example, double effect and dual loop systems disclosed in U.S. Pat. Nos. 3,266,266 and 4,542,628 and triple effect systems disclosed in U.S. Pat. Nos. 5,335,515 and 5,390,509. The disclosures in the aforesaid patents are incorporated herein in their entirety, including but not limited to the descriptions of the apparatus and systems disclosed therein. Especially preferred are the single and double effect absorption chiller and refrigeration systems which include those systems in which the single or double effect components are a portion of the system, such as a dual loop triple effect system comprising combined single stage loops as disclosed in U.S. Pat. No. 4,732,008.

The following examples are set forth in specific detail for exemplification of the invention and should not be considered to limit the invention in any way.

EXAMPLE I

A series of exemplary runs were made using various ethers as additives to aqueous refrigerant/absorbent compositions by passing the mixture or solution over a heat exchanger surface in a falling film test absorber. The absorber used had a heat transfer tube surface area of about 0.09 square meters, a tube 1 meter long having a 28.6 mm outside diameter. The absorber was operated at an initial solution temperature of 48° C., a vapor pressure of 10.0 mbar, a solution flow of 500 grams/minute, a tube temperature of 30° C. and a dew point of 7° C. Tube temperatures, flow rates and vapor pressures during operation were made by suitable monitors.

Butyl ether, in amounts specified in Table 1 below, as an additive to an aqueous absorption composition of $LiBr-H_2O$ with 60% salt by weight was passed over the test falling film absorber. The results are shown in Table 1 wherein: $H_2O$ dT is the increase in water temperature on the inside of the cooling tube, solution flow and absorption taking place on the outside of the tube, a larger number showing more heat has been transferred; dx is the change in solution concentration, a direct measure of mass transfer, a larger number showing more water vapor has been absorbed; Q is the absorber load, the product of the water flow rate $H_2O$ dT and the heat capacity of the water, a larger number showing improvement; and $h_o$ is the outside film transfer coefficient, based upon the combination of Q, dx, and the thermal resistivity of the metal tubes and cooling water, a larger number showing improvement. These relationships are well known to the art and are more fully described in U.S. Pat. No. 5,419,145, incorporated herein by reference. The results are shown in Table 1.

TABLE 1

| Additive ppm | $H_2O$ dT ° C. | dx % | Q Watts | $h_o$ W/(m²)(° C.) |
|---|---|---|---|---|
| 0 | 0.76 | 1.61 | 856 | 1016 |
| 0 | 0.76 | 1.73 | 850 | 1002 |
| 0 | 0.75 | 1.69 | 838 | 963 |
| 5 | 0.93 | 1.94 | 1060 | 1816 |
| 5 | 0.91 | 1.88 | 1035 | 1820 |
| 5 | 1.02 | 2.53 | 1154 | 1637 |
| 10 | 0.97 | 1.74 | 1105 | 2019 |
| 10 | 1.03 | 2.35 | 1164 | 1566 |
| 10 | 1.04 | 2.16 | 1183 | 1626 |
| 20 | 0.88 | 1.83 | 1003 | 1731 |
| 20 | 0.96 | 2.61 | 1091 | 1970 |
| 20 | 1.01 | 2.54 | 1151 | 1589 |
| 50 | 0.69 | 0.99 | 782 | 1345 |
| 50 | 0.80 | 1.99 | 903 | 1561 |
| 50 | 0.88 | 1.90 | 994 | 1740 |
| 50 | 0.89 | 2.00 | 1007 | 1794 |
| 50 | 1.01 | 2.23 | 1151 | 1951 |
| 50 | 1.05 | 2.35 | 1192 | 1954 |
| 75 | 1.07 | 2.49 | 1216 | 2070 |
| 75 | 1.09 | 2.94 | 1243 | 1752 |
| 75 | 1.11 | 2.78 | 1261 | 1714 |
| 75 | 1.11 | 2.88 | 1261 | 1887 |
| 75 | 1.12 | 2.91 | 1270 | 1959 |
| 100 | 0.94 | 2.25 | 1053 | 1852 |
| 100 | 1.00 | 2.71 | 1124 | 1702 |
| 100 | 0.96 | 2.44 | 1072 | 1594 |
| 150 | 1.02 | 2.61 | 1142 | 1957 |
| 150 | 1.02 | 2.69 | 1148 | 1585 |
| 150 | 1.06 | 2.41 | 1187 | 1611 |

EXAMPLE II

In similar manner as Example I, hexyl ether, in amounts specified in Table 2 below, was added to an aqueous refrigerant/absorbent composition having the same composition as Example I and passed over a falling film absorber under the same conditions as set forth in Example I. The results are shown in Table 2.

TABLE 2

| Additive ppm | $H_2O$ dT °C. | dx % | Q Watts | $h_o$ W/(m²)(° C.) |
|---|---|---|---|---|
| 0 | 0.93 | 2.09 | 1007 | 1251 |
| 0 | 0.97 | 2.09 | 1053 | 1297 |
| 0 | 0.97 | 2.12 | 1045 | 1186 |
| 5 | 0.96 | 2.15 | 1043 | 1151 |
| 5 | 0.94 | 2.31 | 1022 | 1184 |
| 5 | 0.95 | 2.27 | 1025 | 1178 |
| 10 | 0.95 | 2.26 | 1026 | 1160 |
| 10 | 0.94 | 2.18 | 1022 | 1180 |
| 10 | 0.95 | 2.19 | 1025 | 1162 |
| 20 | 0.97 | 2.36 | 1054 | 1145 |
| 20 | 1.02 | 2.50 | 1107 | 1273 |
| 20 | 0.98 | 2.35 | 1062 | 1231 |
| 20 | 0.96 | 2.28 | 1033 | 1230 |
| 20 | 0.94 | 2.26 | 1023 | 1223 |
| 50 | 1.10 | 2.71 | 1189 | 1503 |
| 50 | 1.11 | 2.68 | 1207 | 1420 |
| 50 | 1.11 | 2.61 | 1201 | 1426 |
| 100 | 1.14 | 2.13 | 1236 | 2054 |
| 100 | 1.23 | 2.53 | 1335 | 1621 |
| 200 | 1.66 | 3.49 | 1795 | 2704 |
| 200 | 1.41 | 3.81 | 1523 | 1981 |
| 500 | 1.42 | 3.25 | 1540 | 2835 |
| 500 | 1.47 | 3.24 | 1586 | 2784 |
| 1000 | 1.68 | 3.74 | 1820 | 3056 |
| 1000 | 1.59 | 4.07 | 1716 | 2713 |

EXAMPLE III

In similar manner to Example I, octyl ether, in amounts specified in Table 3 below, was added to an aqueous refrigerant/absorbent composition having the same composition as Example I and passed over a falling film absorber under the same conditions as set forth in Example I. The results are shown in Table 3.

TABLE 3

| Additive ppm | $H_2O$ dT °C. | dx % | Q Watts | $h_o$ W/(m²)(° C.) |
|---|---|---|---|---|
| 0 | 0.79 | 1.94 | 888 | 1255 |
| 0 | 0.81 | 2.32 | 904 | 1054 |
| 0 | 0.81 | 2.48 | 904 | 1039 |
| 10 | 0.86 | 2.27 | 964 | 1019 |
| 10 | 0.84 | 2.56 | 940 | 952 |
| 10 | 1.09 | 2.96 | 1219 | 1601 |
| 10 | 1.09 | 2.99 | 1227 | 1602 |
| 10 | 1.09 | 2.99 | 1213 | 1582 |
| 20 | 0.89 | 2.46 | 984 | 1105 |
| 20 | 0.93 | 2.83 | 1029 | 1242 |
| 20 | 1.08 | 2.95 | 1198 | 1496 |
| 35 | 0.93 | 2.46 | 1027 | 1221 |
| 35 | 0.97 | 2.71 | 1074 | 1188 |
| 50 | 0.82 | 2.26 | 909 | 1046 |
| 50 | 0.88 | 2.56 | 972 | 1100 |
| 50 | 0.98 | 3.32 | 1090 | 1226 |
| 100 | 0.93 | 2.74 | 1028 | 1261 |

EXAMPLE IV

In similar manner to Example I, methyl phenyl ether (anisole), in amounts specified in Table 4 below, was added to an aqueous refrigerant/absorbent composition having the same composition as Example I and passed over a falling film absorber under the same conditions as set forth in Example I. The results are shown in Table 4.

TABLE 4

| Additive ppm | $H_2O$ dT °C. | dx % | Q Watts | $h_o$ W/(m²)(° C.) |
|---|---|---|---|---|
| 0 | 0.78 | 2.10 | 908 | 1157 |
| 0 | 0.77 | 2.14 | 894 | 1147 |
| 0 | 0.78 | 2.19 | 900 | 1102 |
| 0 | 0.79 | 2.16 | 912 | 1119 |
| 7.6 | 0.77 | 2.06 | 897 | 1369 |
| 7.6 | 0.78 | 2.08 | 902 | 1322 |
| 7.6 | 0.78 | 2.12 | 906 | 1288 |
| 17.1 | 0.75 | 1.92 | 873 | 1523 |
| 17.1 | 0.78 | 2.00 | 906 | 1510 |
| 17.1 | 0.80 | 2.09 | 928 | 1417 |
| 25.8 | 0.79 | 2.15 | 917 | 1379 |
| 25.8 | 0.80 | 2.17 | 933 | 1351 |
| 49.4 | 0.80 | 2.04 | 924 | 1463 |
| 49.4 | 0.81 | 2.09 | 941 | 1430 |
| 49.4 | 0.81 | 2.11 | 941 | 1407 |
| 103.1 | 0.79 | 2.00 | 912 | 1535 |
| 103.1 | 0.79 | 2.06 | 922 | 1518 |
| 103.1 | 0.80 | 2.08 | 929 | 1507 |
| 203.4 | 0.77 | 1.97 | 900 | 1574 |
| 203.4 | 0.79 | 2.02 | 915 | 1560 |
| 203.4 | 0.80 | 2.07 | 934 | 1525 |
| 304.4 | 0.67 | 1.61 | 772 | 1562 |
| 304.4 | 0.67 | 1.61 | 772 | 1562 |
| 304.4 | 0.73 | 1.82 | 849 | 1609 |
| 304.4 | 0.78 | 1.97 | 910 | 1605 |
| 304.4 | 0.79 | 2.06 | 922 | 1542 |
| 304.4 | 0.82 | 2.11 | 948 | 1514 |
| 496.9 | 0.77 | 1.92 | 897 | 1621 |
| 496.9 | 0.77 | 1.97 | 895 | 1595 |
| 496.9 | 0.79 | 2.01 | 914 | 1553 |
| 754.1 | 0.76 | 1.80 | 878 | 1681 |

EXAMPLE V

In similar manner as Example I, butyl ether, in amounts specified in Table 5 below, was added to an aqueous refrigerant/absorbent composition of $CaBr_2$-$H_2O$ with 58.8% salt by weight and was passed over a falling film absorber operated at an initial refrigerant/absorbent composition temperature of 37° C., vapor pressure of 11.5 mbar, and tube temperature of 28.2° C. The results are shown in Table 5.

TABLE 5

| Additive ppm | $H_2O$ dT °C. | dx % | Q Watts | $h_o$ W/(m²)(° C.) |
|---|---|---|---|---|
| 0 | 0.32 | 0.79 | 373 | 1036 |
| 0 | 0.34 | 0.51 | 395 | 1189 |
| 0 | 0.33 | 0.77 | 382 | 1092 |
| 0 | 0.32 | 0.76 | 372 | 1072 |
| 10.4 | 0.38 | 1.01 | 445 | 1370 |
| 10.4 | 0.34 | 1.01 | 389 | 1146 |
| 10.4 | 0.34 | 1.11 | 389 | 1113 |
| 20.2 | 0.38 | 1.04 | 446 | 1318 |
| 20.2 | 0.39 | 1.06 | 447 | 1305 |
| 20.2 | 0.39 | 1.08 | 447 | 1287 |
| 41.1 | 0.37 | 0.86 | 430 | 1422 |
| 41.1 | 0.36 | 0.95 | 424 | 1325 |
| 41.1 | 0.36 | 0.88 | 420 | 1301 |
| 70.7 | 0.28 | 0.54 | 325 | 1124 |
| 70.7 | 0.34 | 0.65 | 399 | 1367 |
| 70.7 | 0.35 | 0.70 | 403 | 1367 |
| 100 | 0.31 | 0.54 | 362 | 1497 |
| 100 | 0.31 | 0.64 | 362 | 1478 |
| 100 | 0.34 | 0.71 | 395 | 1519 |
| 100 | 0.34 | 0.77 | 398 | 1512 |
| 150 | 0.28 | 0.58 | 324 | 1722 |
| 150 | 0.33 | 0.57 | 386 | 1809 |
| 150 | 0.34 | 0.66 | 396 | 1705 |

TABLE 5-continued

| Additive ppm | $H_2O$ dT ° C. | dx % | Q Watts | $h_o$ W/($m^2$)(° C.) |
|---|---|---|---|---|
| 200 | 0.35 | 0.80 | 409 | 1640 |
| 200 | 0.35 | 0.84 | 411 | 1556 |
| 200 | 0.35 | 0.89 | 406 | 1492 |
| 249 | 0.33 | 0.62 | 384 | 1813 |
| 249 | 0.35 | 0.68 | 403 | 1697 |
| 249 | 0.35 | 0.69 | 406 | 1698 |
| 497 | 0.33 | 0.63 | 383 | 1774 |
| 497 | 0.36 | 0.50 | 417 | 1561 |
| 497 | 0.37 | 0.63 | 433 | 1565 |
| 1004 | 0.31 | 0.56 | 365 | 1829 |
| 1004 | 0.33 | 0.66 | 389 | 1557 |

EXAMPLE VI

In similar manner as Example I, butyl ether, in amounts specified in Table 6 below, was added to an aqueous refrigerant/absorbent composition of $ZnBr_2$-$H_2O$ with 81.5% salt by weight and was passed over a falling film absorber operated at initial refrigerant/absorbent composition temperature of 48° C., vapor pressure of 10 mbar, and tube temperature of 30° C. The results are shown in Table 6.

TABLE 6

| Additive ppm | $H_2O$ dT ° C. | dx % | Q Watts | $h_o$ W/($m^2$)(° C.) |
|---|---|---|---|---|
| 0 | 0.40 | 0.59 | 469 | 820 |
| 0 | 0.39 | 0.57 | 452 | 804 |
| 0 | 0.39 | 0.64 | 459 | 802 |
| 0 | 0.37 | 0.56 | 433 | 728 |
| 0 | 0.37 | 0.49 | 430 | 745 |
| 5 | 0.45 | 0.95 | 531 | 757 |
| 5 | 0.46 | 1.04 | 538 | 726 |
| 5 | 0.46 | 1.04 | 545 | 727 |
| 5 | 0.46 | 1.04 | 545 | 727 |
| 10.2 | 0.54 | 1.13 | 626 | 860 |
| 10.2 | 0.51 | 1.20 | 597 | 826 |
| 10.2 | 0.52 | 1.20 | 604 | 852 |
| 10.2 | 0.53 | 1.22 | 619 | 880 |
| 10.2 | 0.52 | 1.20 | 611 | 862 |
| 19.8 | 0.59 | 1.44 | 696 | 1020 |
| 19.8 | 0.59 | 1.39 | 688 | 1005 |
| 19.8 | 0.56 | 1.47 | 659 | 955 |
| 19.8 | 0.54 | 1.46 | 637 | 922 |
| 30.2 | 0.61 | 1.56 | 714 | 1084 |
| 30.2 | 0.62 | 1.52 | 729 | 1095 |
| 30.2 | 0.62 | 1.63 | 729 | 1097 |
| 30.2 | 0.60 | 1.59 | 708 | 1034 |
| 40.2 | 0.62 | 1.68 | 728 | 1165 |
| 40.2 | 0.61 | 1.67 | 721 | 1082 |
| 40.2 | 0.62 | 1.49 | 726 | 1073 |
| 65.1 | 0.63 | 1.72 | 738 | 1114 |
| 65.1 | 0.65 | 1.82 | 759 | 1186 |
| 65.1 | 0.65 | 1.71 | 759 | 1174 |
| 99.8 | 0.65 | 1.54 | 760 | 1201 |
| 99.8 | 0.66 | 1.61 | 769 | 1241 |
| 99.8 | 0.65 | 1.67 | 763 | 1240 |
| 148.9 | 0.65 | 1.64 | 763 | 1231 |
| 148.9 | 0.65 | 1.68 | 768 | 1244 |
| 148.9 | 0.65 | 1.49 | 760 | 1211 |
| 148.9 | 0.65 | 1.51 | 758 | 1270 |
| 254 | 0.67 | 1.72 | 788 | 1324 |
| 254 | 0.67 | 1.65 | 782 | 1318 |
| 254 | 0.66 | 1.63 | 778 | 1305 |
| 254 | 0.67 | 1.55 | 782 | 1297 |
| 501 | 0.66 | 1.58 | 769 | 1299 |
| 501 | 0.65 | 1.50 | 760 | 1244 |
| 501 | 0.58 | 1.10 | 678 | 1083 |
| 501 | 0.66 | 1.50 | 772 | 1178 |
| 501 | 0.57 | 1.19 | 664 | 1100 |

TABLE 6-continued

| Additive ppm | $H_2O$ dT ° C. | dx % | Q Watts | $h_o$ W/($m^2$)(° C.) |
|---|---|---|---|---|
| 501 | 0.63 | 1.56 | 740 | 1153 |
| 501 | 0.65 | 1.43 | 759 | 1204 |
| 501 | 0.64 | 1.45 | 749 | 1172 |

EXAMPLE VII

In similar manner as Example VI, phenyl ether, in amounts specified in Table 7 below, was added to an aqueous refrigerant/absorbent composition of $ZnBr_2$-$H_2O$ with 81.8% salt by weight and passed over a falling film absorber under the same conditions as set forth in Example VI. The results are shown in Table 7.

TABLE 7

| Additive ppm | $H_2O$ dT ° C. | dx % | Q Watts | $h_o$ W/($m^2$)(° C.) |
|---|---|---|---|---|
| 0 | 0.42 | 0.50 | 452 | 622 |
| 0 | 0.42 | 0.51 | 456 | 619 |
| 0 | 0.42 | 0.31 | 455 | 652 |
| 5 | 0.43 | 0.65 | 465 | 590 |
| 5 | 0.44 | 0.70 | 474 | 598 |
| 10 | 0.47 | 0.82 | 507 | 611 |
| 10 | 0.47 | 0.82 | 507 | 611 |
| 10 | 0.46 | 0.86 | 502 | 613 |
| 20 | 0.58 | 1.21 | 625 | 753 |
| 20 | 0.59 | 1.45 | 639 | 760 |
| 50 | 0.70 | 1.51 | 758 | 948 |
| 50 | 0.70 | 1.51 | 758 | 948 |
| 50 | 0.70 | 1.51 | 761 | 956 |
| 100 | 0.70 | 1.59 | 755 | 971 |
| 100 | 0.72 | 1.71 | 775 | 993 |
| 200 | 0.62 | 1.19 | 669 | 940 |
| 200 | 0.70 | 1.40 | 761 | 979 |
| 500 | 0.51 | 1.02 | 555 | 663 |
| 500 | 0.51 | 0.90 | 547 | 657 |
| 1000 | 0.46 | 0.81 | 494 | 591 |
| 1000 | 0.45 | 0.62 | 492 | 596 |
| 1500 | 0.46 | 0.54 | 493 | 599 |
| 1500 | 0.45 | 0.54 | 490 | 604 |

EXAMPLE VIII

In similar manner as Example VI, methyl phenyl ether (anisole), in amounts specified in Table 8 below, was added to an aqueous refrigerant/absorbent composition having the same composition as Example VI and was passed over a falling film absorber operated under the same conditions as in Example VI. The results are shown in Table 8.

TABLE 8

| Additive ppm | $H_2O$ dT ° C. | dx % | Q Watts | $h_o$ W/($m^2$)(° C.) |
|---|---|---|---|---|
| 0 | 0.39 | 0.49 | 452 | 935 |
| 0 | 0.39 | 0.43 | 456 | 967 |
| 5 | 0.38 | 0.42 | 449 | 873 |
| 5 | 0.38 | 0.51 | 442 | 857 |
| 10.1 | 0.37 | 0.51 | 438 | 860 |
| 10.1 | 0.37 | 0.51 | 439 | 850 |
| 10.1 | 0.38 | 0.52 | 442 | 848 |
| 25.5 | 0.39 | 0.53 | 457 | 892 |
| 25.5 | 0.38 | 0.50 | 447 | 876 |
| 25.5 | 0.38 | 0.51 | 449 | 875 |
| 50 | 0.38 | 0.69 | 449 | 894 |
| 50 | 0.38 | 0.72 | 444 | 852 |

TABLE 8-continued

| Additive ppm | $H_2O$ dT °C. | dx % | Q Watts | $h_o$ W/($m^2$)(° C.) |
|---|---|---|---|---|
| 50 | 0.38 | 0.72 | 446 | 856 |
| 100 | 0.38 | 0.75 | 442 | 754 |
| 100 | 0.38 | 0.76 | 440 | 769 |
| 100 | 0.38 | 0.76 | 442 | 766 |
| 150 | 0.37 | 0.77 | 436 | 726 |
| 150 | 0.37 | 0.79 | 435 | 724 |
| 150 | 0.37 | 0.77 | 437 | 728 |
| 250 | 0.38 | 0.64 | 447 | 824 |
| 250 | 0.35 | 0.63 | 413 | 755 |
| 250 | 0.35 | 0.65 | 415 | 751 |
| 500 | 0.26 | 0.29 | 303 | 604 |
| 500 | 0.27 | 0.30 | 318 | 628 |
| 745 | 0.27 | 0.32 | 319 | 762 |
| 745 | 0.28 | 0.26 | 327 | 635 |
| 745 | 0.28 | 0.26 | 331 | 631 |

EXAMPLE IX

In similar manner as Example I, hexyl ether, in amounts specified in Table 9 below, was added to an aqueous refrigerant/absorbent composition of equal amounts of LiBr-$ZnBr_2$ in $H_2O$ with 87.0% salt by weight and was passed over a falling film absorber operated at initial refrigerant/absorbent composition temperature of 107° C., vapor pressure of 11.5 mbar, and tube temperature of 88° C. The results are shown in Table 9.

TABLE 9

| Additive ppm | $H_2O$ dT °C. | dx % | Q Watts | $h_o$ W/($m^2$)(° C.) |
|---|---|---|---|---|
| 0 | 0.61 | 0.74 | 674 | 718 |
| 0 | 0.62 | 0.77 | 690 | 751 |
| 0 | 0.60 | 0.80 | 666 | 736 |
| 0 | 0.60 | 0.80 | 666 | 736 |
| 0 | 0.60 | 0.63 | 667 | 741 |
| 0 | 0.59 | 0.91 | 659 | 714 |
| 0 | 0.58 | 0.66 | 642 | 711 |
| 20 | 0.58 | 0.66 | 645 | 733 |
| 20 | 0.58 | 0.68 | 639 | 726 |
| 50 | 0.60 | 0.70 | 665 | 754 |
| 50 | 0.61 | 0.69 | 673 | 772 |
| 100 | 0.64 | 0.74 | 715 | 830 |
| 100 | 0.63 | 0.72 | 701 | 820 |
| 200 | 0.69 | 0.80 | 761 | 928 |
| 200 | 0.68 | 0.79 | 749 | 919 |
| 200 | 0.62 | 0.74 | 683 | 776 |
| 200 | 0.62 | 0.69 | 684 | 746 |
| 200 | 0.61 | 0.67 | 682 | 801 |
| 400 | 0.65 | 0.86 | 717 | 905 |
| 400 | 0.63 | 0.79 | 702 | 897 |
| 600 | 0.65 | 0.76 | 724 | 982 |
| 600 | 0.60 | 0.73 | 664 | 802 |
| 600 | 0.62 | 0.73 | 666 | 821 |
| 800 | 0.66 | 0.85 | 717 | 929 |
| 800 | 0.64 | 0.79 | 697 | 889 |
| 800 | 0.63 | 0.78 | 687 | 874 |
| 1000 | 0.67 | 0.82 | 721 | 983 |
| 1000 | 0.66 | 0.81 | 718 | 966 |

EXAMPLE X

In similar manner as Example IX, octyl ether, in amounts specified in Table 10 below, was added to an aqueous refrigerant/absorbent composition having the same composition as in Example IX except it was 87.1% salt by weight, and was passed over a falling film absorber operated under the same conditions as in Example IX. The results are shown in Table 10.

TABLE 10

| Additive ppm | $H_2O$ dT °C. | dx % | Q Watts | $h_o$ W/($m^2$)(° C.) |
|---|---|---|---|---|
| 0 | 0.55 | 0.75 | 615 | 725 |
| 0 | 0.57 | 0.73 | 629 | 777 |
| 0 | 0.58 | 0.73 | 640 | 799 |
| 0 | 0.58 | 0.73 | 648 | 840 |
| 10 | 0.69 | 1.03 | 764 | 757 |
| 10 | 0.67 | 1.00 | 737 | 730 |
| 25 | 0.81 | 1.25 | 897 | 952 |
| 25 | 0.80 | 1.23 | 884 | 944 |
| 25 | 0.57 | 0.73 | 634 | 612 |
| 100 | 0.90 | 1.44 | 1002 | 1105 |
| 100 | 0.90 | 1.43 | 997 | 1116 |
| 200 | 0.90 | 1.22 | 995 | 1276 |
| 200 | 0.90 | 1.21 | 997 | 1245 |
| 300 | 0.93 | 1.29 | 1028 | 1122 |
| 300 | 0.93 | 1.33 | 1027 | 1129 |
| 500 | 0.91 | 1.31 | 1004 | 1109 |
| 500 | 0.93 | 1.33 | 1033 | 1137 |
| 1000 | 0.77 | 1.00 | 854 | 992 |
| 1000 | 0.82 | 1.11 | 904 | 1013 |
| 1000 | 0.59 | 0.72 | 651 | 1002 |
| 1000 | 0.65 | 0.97 | 720 | 956 |

EXAMPLE XI

In similar manner to Example IX, methyl phenyl ether (anisole), in amounts specified in Table 11 below, was added to an aqueous refrigerant/absorbent composition having the same composition as Example IX and passed over a falling film absorber under the same conditions as set forth in Example IX. The results are shown in Table 11.

TABLE 11

| Additive ppm | $H_2O$ dT °C. | dx % | Q Watts | $h_o$ W/($m^2$)(° C.) |
|---|---|---|---|---|
| 0 | 0.51 | 0.66 | 565 | 544 |
| 0 | 0.51 | 0.72 | 571 | 546 |
| 0 | 0.52 | 0.68 | 575 | 546 |
| 0 | 0.54 | 0.84 | 596 | 591 |
| 0 | 0.50 | 0.74 | 556 | 556 |
| 0 | 0.53 | 0.68 | 591 | 602 |
| 10 | 0.50 | 0.70 | 559 | 602 |
| 10 | 0.51 | 0.65 | 568 | 630 |
| 50 | 0.36 | 0.29 | 403 | 719 |
| 50 | 0.39 | 0.24 | 427 | 775 |
| 100 | 0.29 | 0.06 | 319 | 628 |
| 100 | 0.29 | 0.03 | 320 | 621 |
| 200 | 0.25 | 0.07 | 282 | 659 |
| 200 | 0.25 | 0.11 | 274 | 591 |

EXAMPLE XII

In similar maimer to Example IX, benzyl ether, in amounts specified in Table 12 below, was added to an aqueous refrigerant/absorbent composition of the same composition as in Example IX except that it was 86.8% salt by weight and passed over a falling film absorber under the same conditions as set forth in Example IX. The results are shown in Table 12.

TABLE 12

| Additive ppm | $H_2O$ dT °C. | dx % | Q Watts | $h_o$ W/($m^2$)(° C.) |
|---|---|---|---|---|
| 0 | 0.61 | 0.60 | 679 | 999 |
| 0 | 0.63 | 0.50 | 695 | 1012 |

TABLE 12-continued

| Additive ppm | $H_2O$ dT °C. | dx % | Q Watts | $h_o$ W/(m²)(° C.) |
|---|---|---|---|---|
| 0 | 0.64 | 0.65 | 713 | 980 |
| 0 | 0.63 | 0.72 | 702 | 967 |
| 0 | 0.62 | 0.73 | 692 | 967 |
| 0 | 0.63 | 0.73 | 696 | 981 |
| 20 | 0.61 | 0.70 | 681 | 973 |
| 20 | 0.62 | 0.69 | 686 | 990 |
| 50 | 0.61 | 0.66 | 672 | 968 |
| 50 | 0.61 | 0.67 | 675 | 975 |
| 100 | 0.59 | 0.60 | 653 | 954 |
| 100 | 0.59 | 0.59 | 652 | 949 |
| 200 | 0.54 | 0.43 | 602 | 1011 |
| 200 | 0.54 | 0.46 | 602 | 1030 |
| 200 | 0.62 | 0.51 | 682 | 882 |
| 200 | 0.62 | 0.55 | 683 | 1208 |
| 200 | 0.62 | 0.55 | 684 | 1249 |
| 200 | 0.62 | 0.48 | 693 | 1271 |
| 200 | 0.63 | 0.80 | 693 | 1049 |
| 200 | 0.63 | 0.73 | 696 | 1060 |
| 500 | 0.57 | 0.45 | 631 | 1121 |
| 500 | 0.57 | 0.45 | 635 | 1186 |
| 500 | 0.58 | 0.47 | 642 | 1148 |
| 500 | 0.57 | 0.47 | 634 | 1124 |
| 1000 | 0.55 | 0.37 | 613 | 934 |
| 1000 | 0.57 | 0.44 | 627 | 986 |
| 1000 | 0.56 | 0.45 | 620 | 993 |

EXAMPLE XIII

In similar manner to Example IX, perfluoro-2-butyltetrahydrofuran in amounts specified in Table 13 below, was added to an aqueous refrigerant/absorbent composition of the same composition as Example IX except at 73.5% salt by weight and was passed over a falling film absorber operated at an initial refrigerant/absorbent composition temperature of 42° C., vapor pressure of 11.5 mbar, and tube temperature of 30° C. The results are shown in Table 13.

TABLE 13

| Additive ppm | $H_2O$ dT °C. | dx % | Q Watts | $h_o$ W/(m²)(° C.) |
|---|---|---|---|---|
| 0 | 0.63 | 0.38 | 414 | 1486 |
| 0 | 0.64 | 0.39 | 423 | 1507 |
| 0 | 0.60 | 0.31 | 395 | 1357 |
| 0 | 0.63 | 0.32 | 413 | 1404 |
| 50 | 1.16 | 1.07 | 766 | 1403 |
| 50 | 1.15 | 1.08 | 762 | 1411 |
| 100 | 1.17 | 1.07 | 771 | 1324 |
| 100 | 1.16 | 1.09 | 766 | 1324 |
| 100 | 1.11 | 1.15 | 731 | 1157 |
| 100 | 0.99 | 1.11 | 650 | 1147 |
| 200 | 0.94 | 1.15 | 623 | 1116 |
| 200 | 0.94 | 1.14 | 621 | 1134 |
| 200 | 0.95 | 1.14 | 628 | 1049 |
| 300 | 0.97 | 1.18 | 640 | 1035 |
| 300 | 0.95 | 1.18 | 625 | 1056 |
| 300 | 0.96 | 1.15 | 631 | 1072 |
| 300 | 0.95 | 1.16 | 628 | 1084 |
| 500 | 1.11 | 1.02 | 735 | 1508 |
| 500 | 1.04 | 1.19 | 687 | 1272 |
| 500 | 1.03 | 1.16 | 683 | 1284 |
| 500 | 1.04 | 1.16 | 683 | 1293 |
| 750 | 1.05 | 1.17 | 692 | 1134 |
| 750 | 0.99 | 1.05 | 656 | 1556 |
| 750 | 1.04 | 1.17 | 685 | 1144 |
| 1000 | 1.03 | 1.20 | 681 | 1263 |
| 1000 | 1.03 | 1.15 | 677 | 1327 |
| 1000 | 0.99 | 1.17 | 655 | 1324 |
| 1000 | 1.00 | 1.21 | 661 | 1334 |

TABLE 13-continued

| Additive ppm | $H_2O$ dT °C. | dx % | Q Watts | $h_o$ W/(m²)(° C.) |
|---|---|---|---|---|
| 1500 | 0.81 | 0.83 | 536 | 2731 |
| 1500 | 0.83 | 0.81 | 548 | 2753 |

EXAMPLE XIV—COMPARATIVE EXAMPLE

In the same manner as Example XIII, perfluoropolyglycolether, in amounts shown in Table 14 below, was added to an aqueous refrigerant/absorbent composition having the same composition as in Example XIII except at 87% salt by weight and was passed over a falling film absorber operated at an initial refrigerant/absorbent temperature of 107° C., vapor pressure of 11.5 mbar, and tube temperature of 88° C. The results are shown in Table 14.

TABLE 14

| Additive ppm | $H_2O$ dT °C. | dx % | Q Watts | $h_o$ W/(m²)(° C.) |
|---|---|---|---|---|
| 0 | 0.66 | 0.66 | 726 | 781 |
| 0 | 0.65 | 0.67 | 726 | 759 |
| 0 | 0.65 | 0.71 | 722 | 765 |
| 0 | 0.71 | 0.58 | 783 | 830 |
| 0 | 0.72 | 0.56 | 795 | 879 |
| 0 | 0.65 | 0.57 | 721 | 782 |
| 0 | 0.71 | 0.69 | 790 | 815 |
| 10 | 0.73 | 0.72 | 808 | 883 |
| 10 | 0.73 | 0.73 | 809 | 890 |
| 25 | 0.73 | 0.74 | 807 | 846 |
| 25 | 0.72 | 0.74 | 802 | 844 |
| 50 | 0.69 | 0.66 | 763 | 836 |
| 50 | 0.69 | 0.66 | 768 | 840 |
| 100 | 0.63 | 0.54 | 696 | 757 |
| 100 | 0.63 | 0.54 | 697 | 760 |
| 200 | 0.61 | 0.36 | 679 | 694 |
| 200 | 0.60 | 0.59 | 660 | 716 |
| 200 | 0.61 | 0.47 | 673 | 753 |
| 200 | 0.63 | 0.52 | 694 | 694 |
| 500 | 0.62 | 0.52 | 688 | 771 |
| 500 | 0.63 | 0.52 | 693 | 776 |
| 1000 | 0.57 | 0.35 | 627 | 798 |
| 1000 | 0.56 | 0.35 | 623 | 804 |

It is to be understood that discussions of theory, such as the discussion of stable complex formation associated with the use of certain ethers, for example, are included to assist in the understanding of the subject invention and are in no way limiting to the invention in its broad application.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. An absorption fluid composition comprising aqueous refrigerant, at least one metal halide salt absorbent present in an amount to provide a composition useful as a refrigerant/absorbent and at least one ether heat and mass transfer additive selected from the group consisting of aliphatic ethers having about 4 to about 20 carbon atoms selected from the group consisting of butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl ether; aliphatic ethers having, about 4 to about 20 carbon atoms and containing a cyclic ether structure; aliphatic fluorinated and perfluorinated others having about 8 to about 24 carbon atoms; and aromatic ethers having about 7 to about 20 carbon atoms selected from the group consisting of perfluoro-2-butyltetrahydrofuran, phenyl ether, diphenyl ether, methylphenyl ether (anisole) and dibenzyl ether, wherein said at least one ether is normally liquid at system operating conditions and present in an amount effective as an absorption promoter.

2. An absorption fluid composition according to claim 1 wherein said at least one ether is an aliphatic ether having about 4 to about 20 carbon atoms.

3. An absorption fluid composition according to claim 2 wherein said at least one ether contains a cyclic ether structure.

4. An absorption fluid composition according to claim 1 wherein said at least one ether is an aliphatic fluorinated or perfluorinated ether having about 8 to about 24 carbon atoms.

5. An absorption fluid composition according to claim 4 wherein said at least one ether comprises at least one substituted perfluorinated tetrahydrofuran.

6. An absorption fluid composition according to claim 1 wherein said at least one ether is an aromatic ether having about 7 to about 20 carbon atoms.

7. An absorption fluid composition according to claim 1 having about 5 ppm to about 10,000 ppm of said at least one ether, based upon the weight of the total absorption fluid composition.

8. An absorption fluid composition according to claim 1 having about 5 ppm to about 2,000 ppm of said at least one ether, based upon the weight of the total absorption fluid composition.

9. An absorption fluid composition according to claim 1 having about 50 ppm to about 500 ppm of said at least one ether, based upon the weight of the total absorption fluid composition.

10. An absorption fluid composition according to claim 1 wherein said at least one metal halide salt absorbent is selected from the group consisting of lithium bromide, zinc bromide, calcium bromide and mixtures thereof.

11. An absorption fluid composition according to claim 1 additionally comprising at last one corrosion inhibitor.

12. An absorption fluid composition according to claim 11 wherein said corrosion inhibitor comprises a corrosion inhibiting quantity of at least one metal hydroxide.

13. In a process for thermal transfer using an absorption fluid comprising an aqueous metal halide salt refrigerant/absorbent composition, the improvement of obtaining an increased rate of water vapor absorption in said absorption fluid comprising adding thereto an absorption promoting amount of at least one ether heat and mass transfer additive selected from the group consisting of aliphatic ethers having about 4 to about 20 carbon atoms selected from the group consisting of butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl ether; aliphatic ethers having about 4 to about 20 carbon atoms and containing a cyclic ether structure; aliphatic fluorinated and perfluorinated ethers having about 8 to about 24 carbon atoms; and aromatic ethers having about 7 to about 20 carbon atoms selected from the group consisting of perfluoro-2-butyltetrahydrofuran, phenyl ether, diphenyl ether, methylphenyl ether (anisole) and dibenzyl ether, wherein said at least one ether is normally liquid at system operating conditions.

14. In a process for thermal transfer using an aqueous metal halide salt refrigerant/absorbent composition according to claim 13 wherein said at least one ether is an aliphatic ether having about 4 to about 20 carbon atoms.

15. In a process for thermal transfer using an aqueous metal halide salt refrigerant/absorbent composition according to claim 14 wherein said at least one ether contains a cyclic ether structure.

16. In a process for thermal transfer using an aqueous metal halide salt refrigerant/absorbent composition according to claim 13 wherein said at least one ether is an aliphatic fluorinated or perfluorinated ether having about 8 to about 24 carbon atoms.

17. In a process for thermal transfer using an aqueous metal halide salt refrigerant/absorbent composition according to claim 16 wherein said at least one ether comprises at least one substituted perfluorinated tetrahydrofuran.

18. In a process for thermal transfer using an aqueous metal halide salt refrigerant/absorbent composition according to claim 13 wherein said at least one ether is an aromatic ether having about 7 to about 20 carbon atoms.

19. In a process for thermal transfer using an aqueous metal halide salt refrigerant/absorbent composition according to claim 13 having about 5 ppm to about 10,000 ppm of said at least one ether, based upon the weight of the total absorption fluid composition.

20. In a process for thermal transfer using an aqueous metal halide salt refrigerant/absorbent composition according to claim 13 having about 5 ppm to about 2,000 ppm of said at least one ether, based upon the weight of the total absorption fluid composition.

21. In a process for thermal transfer using an aqueous metal halide salt refrigerant/absorbent composition according to claim 13 having about 50 ppm to about 500 ppm of said at least one ether, based upon the weight of the total absorption fluid composition.

22. In a process for thermal transfer using an aqueous metal halide salt refrigerant/absorbent composition according to claim 13 wherein said at least one metal halide salt absorbent is selected from the group consisting of lithium bromide, zinc bromide, calcium bromide and mixtures thereof.

23. In a process for thermal transfer using an aqueous metal halide salt refrigerant/absorbent composition according to claim 13, wherein said absorption fluid additionally comprises at least one corrosion inhibitor.

24. In a process for thermal transfer using an aqueous metal halide salt refrigerant/absorbent composition according to claim 23, wherein said corrosion inhibitor comprises a corrosion inhibiting quantity of at least one metal hydroxide.

25. An apparatus for absorption thermal storage, cooling or heating of the type containing an absorption fluid comprising aqueous refrigerant and at least one metal halide salt absorbent present in an amount to provide a composition useful as a refrigerant/absorbent, the improvement of said absorption fluid additionally comprising an absorption promoting amount of at least one ether heat and mass transfer additive selected from the group consisting of aliphatic ethers having about 4 to about 20 carbon atoms selected from the group consisting of butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl ether; aliphatic ethers having about 4 to about 20 carbon atoms and containing a cyclic ether structure; aliphatic fluorinated and perfluorinated ethers having about 8 to about 24 carbon atoms; and aromatic ethers having about 7 to about 20 carbon atoms selected from the group consisting of perfluoro-2-butyltetrahydrofuran, phenyl ether, diphenyl ether, methylphenyl ether (anisole) and dibenzyl ether, wherein said at least one ether is normally liquid at system operating conditions.

26. An apparatus for absorption thermal storage, cooling or heating according to claim 25 wherein said at least one ether is an aliphatic ether having about 4 to about 20 carbon atoms.

27. An apparatus for absorption thermal storage, cooling or heating according to claim 26 wherein said at least one ether contains a cyclic ether structure.

28. An apparatus for absorption thermal storage, cooling or heating according to claim 25 wherein said at least one ether is an aliphatic fluorinated or perfluorinated ether having about 8 to about 24 carbon atoms.

29. An apparatus for absorption thermal storage, cooling or heating according to claim 28 wherein said at least one ether comprises at least one substituted perfluorinated tetrahydrofuran.

30. An apparatus for absorption thermal storage, cooling or heating according to claim 25 wherein said at least one ether is an aromatic ether having about 7 to about 20 carbon atoms.

31. An apparatus for absorption thermal storage, cooling or heating according to claim 25 having about 5 ppm to about 10,000 ppm of said at least one ether, based upon the weight of the total absorption fluid composition.

32. An apparatus for absorption thermal storage, cooling or heating according to claim 25 having about 5 ppm to about 2,000 ppm of said at least one ether, based upon the weight of the total absorption fluid composition.

33. An apparatus for absorption thermal storage, cooling or heating according to claim 25 having about 50 ppm to about 500 ppm of said at least one ether, based upon the weight of the total absorption fluid composition.

34. An apparatus for absorption thermal storage, cooling or heating according to claim 25 wherein said at least one metal halide salt absorbent is selected from the group consisting of lithium bromide, zinc bromide, calcium bromide and mixtures thereof.

35. An apparatus for absorption thermal storage, cooling or heating according to claim 25, wherein said absorption fluid additionally comprises at least one corrosion inhibitor.

36. An apparatus for absorption thermal storage, cooling or heating according to claim 35, wherein said corrosion inhibitor comprises a corrosion inhibiting quantity of at least one metal hydroxide.

* * * * *